Jan. 18, 1966  C. C. STACK  3,229,667
MECHANICAL PIG HANDLER
Filed Aug. 4, 1964  3 Sheets-Sheet 1

INVENTOR.
CEDRIC C. STACK
BY
Hood, Gust & Irish
Attorneys

INVENTOR.
CEDRIC C. STACK

INVENTOR.
CEDRIC C. STACK

United States Patent Office 3,229,667
Patented Jan. 18, 1966

3,229,667
MECHANICAL PIG HANDLER
Cedric C. Stack, 1620 S. I St., Elwood, Ind.
Filed Aug. 4, 1964, Ser. No. 387,466
11 Claims. (Cl. 119—103)

The present invention relates to a mechanical pig handler and the primary object of the invention is to provide a device whereby a pig or other relatively small animal may be immobilized and may then be held in an elevated position and in any one of a plurality of attitudes wherein parts requiring treatment are exposed and readily accessible, all without injury to the animal and without requiring the exertion of significant energy.

In efficient pig breeding operations, it is well recognized that all pigs should be treated, at a relatively early age, with various inoculations, and that male pigs which are grown for the packing market should be castrated. It is substantially universal practice, therefore, to arrange an appointment with a veterinary surgeon, collect the current crop of young pigs in a corral or other enclosure and treat a relatively large number one at a time in succession. To that end, one man usually drives the pigs, one at a time, to a point at which the veterinary is stationed and helps another man to seize each pig by the hind legs, lift the pig off the ground, head down, and hold the pig in that attitude while the veterinary inoculates it and performs such other operations as may be necessary. At this age, pigs usually weigh from thirty to seventy-five pounds. They will struggle as they are lifted and will fight frantically upon the first infliction of pain or discomfort. Frequently, as a result of such struggles, a hypodermic needle will be inserted at an undesirable location or may be broken off after insertion, or a knife or other cutting instrument may slip or be deflected to result in a damaging and injurious wound. The pig lifter, of course, must not only perform the work of raising a significant mass from the ground over and over again and holding that mass at an uncomfortable and inconvenient height, but must also resist the kicking and squirming of the resentful animal whereby, after treatment of even a few score animals, the lifter becomes seriously exhausted. On some breeding farms, of course, hundreds of pigs must be treated; and it is found that one man simply cannot do the lifting work on so many pigs.

It is the primary object of the present invention, then, to do away with the necessity for such onerous work and to provide apparatus through which a pig may be lifted, with mechanical advantage, to a convenient working height, turned into an attitude in which the surgeon's work may be conveniently accomplished, immobilized during the operation, and then released, all without injury or emotional shock to the animal.

Further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Figure 1:
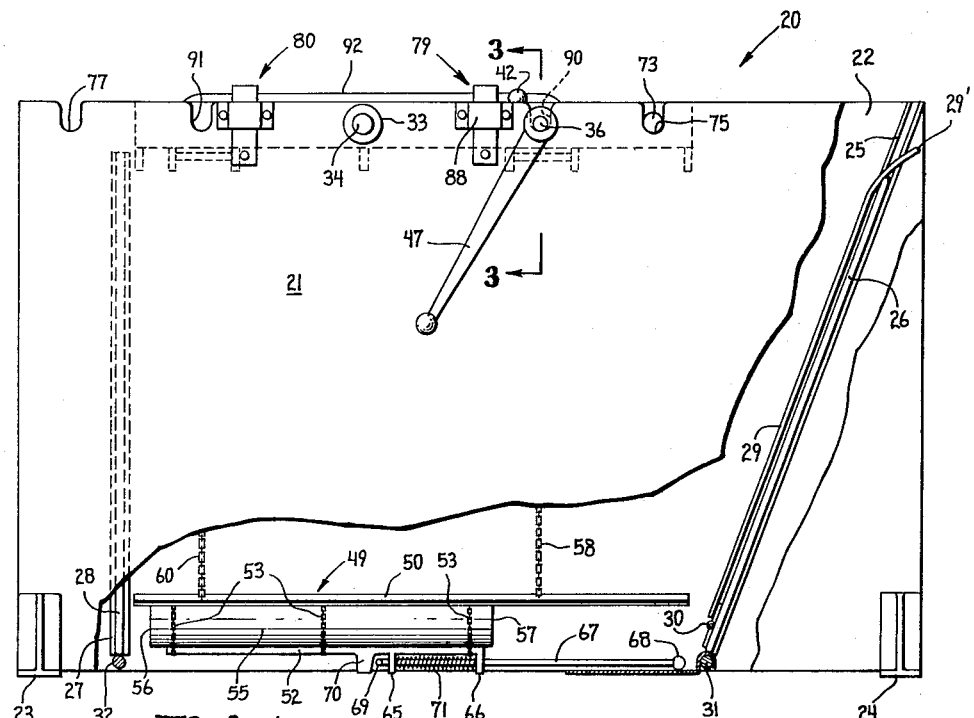
FIG. 1 is a side elevation of a mechanical pig handler constructed in accordance with the present invention, parts being broken away for clarity of illustration.

Referring more particularly to the drawings, it will be seen that the machine comprises a cage indicated generally by the reference numeral 20 comprising upstanding side walls 21 and 22 supported upon base elements 23 and 24. An inclined trackway 25, 25 is mounted upon the walls 21, 22 adjacent one end thereof and slidingly receives an ingress gate 26. A vertical trackway 27, 27 is mounted upon the walls 21, 22 near the opposite end thereof and slidingly receives an egress gate 28. Preferably, a pusher element 29 is carried by the gate 26, the lower end of said pusher element being secured to the lower end of the gate by means of a hinge 30, and the upper end 29' of said pusher element preferably extending above the upper end of the gate 26 as is most clearly illustrated in FIG. 1. A stop bar 31 spans the walls 21, 22 near the bottom thereof to support the gate 26 when it is in closed position, and a similar bar 32 cooperates similarly with the gate 28.

Bearings 33, 33 are supported in perforations near the upper edges of the walls 21, 22 upon a common axis; and trunnions 34, 34, laterally projecting from a backer frame 35, are received in said bearings whereby said backer frame is supported between the upper edges of the walls 21, 22 for rocking movement about said common axis. As is most clearly to be seen in FIG. 2, the frame 35 substantially spans the space between the walls 21 and 22 and preferably extends longitudinally substantially from the vertical plane including the bar 31 to the vertical plane including the bar 32. As shown, the trunnions 34, 34 and the bearings 33, 33 are somewhat closer to the latter plane than to the former.

Figure 2:
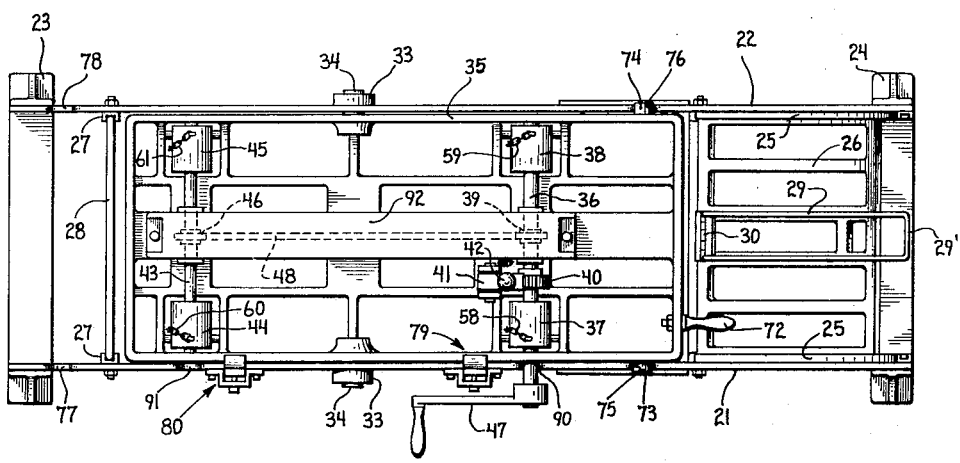
FIG. 2 is a top plan view thereof.

A shaft 36 is journalled in the frame 35 upon an axis near the right hand end of the frame as viewed in FIGS. 1 and 2 and said shaft carries a winch drum 37 and a winch drum 38 adjacent opposite sides of the frame 35, said drums being suitably fixed to said shaft. The shaft 36 further carries a sprocket 39 and a ratchet wheel 40; and a pawl 41 is pivotally mounted on the frame 35 for cooperation with the ratchet 40, being spring-urged into cooperative engagement with the ratchet and preferably carrying a knob 42 whereby said pawl may be manually lifted out of cooperative engagement with said ratchet.

Adjacent the opposite end of the frame 35 there is journalled a second shaft 43, parallel with the shaft 36; and said shaft 43 carries winch drums 44 and 45 and a sprocket 46. The shaft 36 extends laterally beyond one wall 21 and there carries a crank 47; and a chain 48 provides driving connection between the sprockets 39 and 46.

Figure 6:
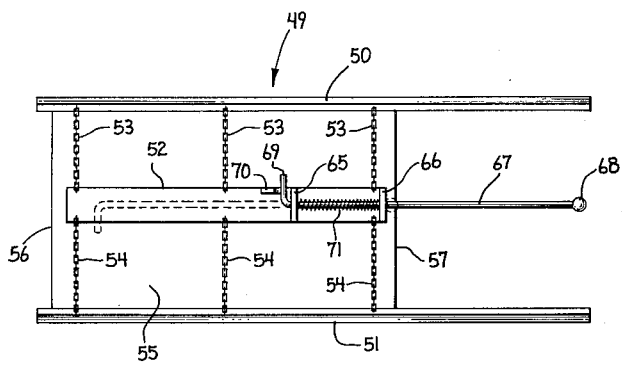
FIG. 6 is a bottom plan view of a cradle constituting an element of the present invention.
Figure 7:
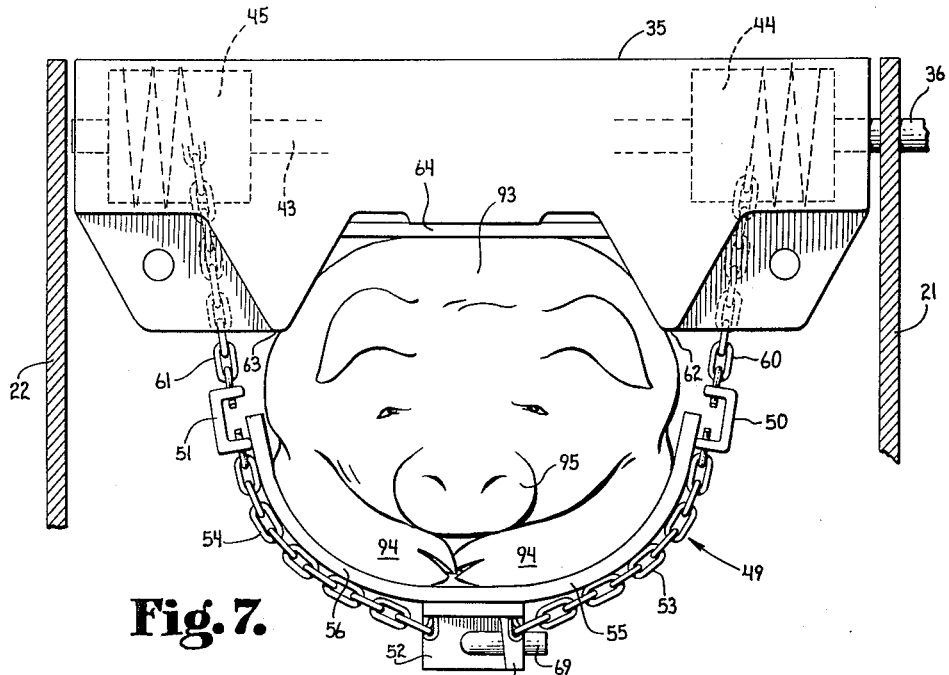
FIG. 7 is an enlarged, fragmentary section looking from the left hand end of FIG. 1.

The reference numeral 49 generally designates a cradle which is illustrated in some detail in FIGS. 6 and 7. Said cradle comprises elongated, rigid stringers 50 and 51 which, when the cradle rests on the ground or the floor (if any) of the cage, will be disposed respectively closely adjacent, and parallel with, the lower edges of the walls 21 and 22. A center runner 52, which is also rigid, is connected to the stringer 50 by a plurality of chains or other flexible elements 53 and to the stringer 51 by a similar plurality of chains or other flexible elements 54. A flexible web 55, which may preferably be a sheet of rubber, foam rubber or other comfortable material which will not injure an animal, rests upon the runner 52 and the elements 53 and 54 in spanning relation to the stringers 50 and 51. The web 55 will preferably be fastened to the runner 52 by rivets or other suitable fastening means which will not roughly project above the upper surface of the web, but may be loose relatively to the stringers 50 and 51, as suggested in FIG. 7. As is most clearly to be seen in FIG. 1, the forward end 56 of the pad 55 is disposed closely adjacent the gate 28; but the rear end 57 of said web is significantly spaced from the gate 26.

Chains or other flexible supporting means 58 and 59 are respectively anchored on the drums 37 and 38 and are connected, at their lower ends, to the stringers 50 and 51, respectively, near the rear ends of said stringers. Similar flexible elements 60 and 61 are anchored respectively on the drums 44 and 45 and are connected, at their lower ends, to the stringers 50 and 51 respectively near the forward ends of said stringers. The elements 58, 59, 60 and 61 are so proportioned and designed as to permit the stringers 50 and 51 to lie on the ground or on the cage floor. It will be seen, however, that when the crank 47 is rotated in a clockwise direction as viewed in FIG. 1, the several chains will be wound on their respective drums to shorten their effective lengths between the backer frame 35 and the stringers 50 and 51, so that the cradle may be lifted toward and, if desired, into contact with the backer frame. It will be obvious that, as the chains are wound upon the drums, the stringers 50 and 51 will tend to move toward each other as the chains 53 and 54 assume catenary curves, and the web 55 will assume a similar curved condition.

Figure 3:
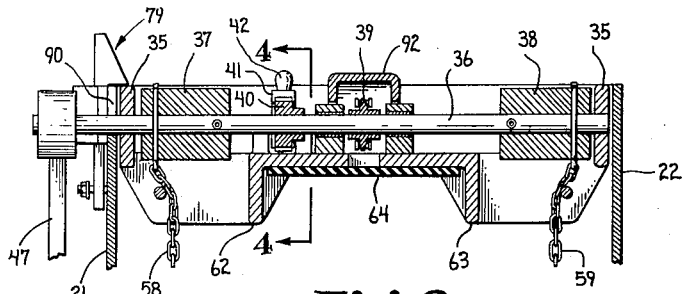
FIG. 3 is an enlarged, fragmentary section taken substantially on the line 3—3 of FIG. 1.
Figure 4:
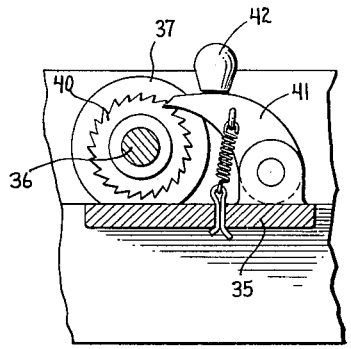
FIG. 4 is an enlarged, fragmentary section taken substantially on the line 4—4 of FIG. 3.

As is most clearly shown in FIGS. 3 and 7, the lower surface of the backer frame 35 is formed to provide laterally spaced, parallel ribs 62 and 63 defining therebetween a space or socket in which is preferably secured a pad 64 which may preferably be of comfortable, ruberoid material. The pad will preferably extend from end to end of the backer frame 35.

Ears 65 and 66 extend downwardly from the runner 52 at spaced points near its rear end, and said ears are formed with aligned perforations in which is slidably mounted a straddle bar 67. As is most clearly illustrated in FIGS. 1 and 6, said straddle bar is formed at its rear end with an enlargement 68 which will not pass the perforation in the ear 66; and its forward end is bent laterally to define a toe 69 whereby said straddle bar may be readily manipulated. In the extreme position illustrated in solid lines in FIG. 6, it will be seen that the straddle bar extends rearwardly beyond the rear end 57 of the web 55 and substantially to the plane common to the rear ends of the stringers 50 and 51. A stop 70 is formed on the runner 52 so that, when the toe 69 is turned into its solid line position, the straddle bar will be held in its rearwardly-projected position. The bar 67 may be turned upon its own axis to swing the toe 69 out of registry with the stop 70, whereupon said bar may be retracted to the broken line position thereof in FIG. 6. Preferably, a coiled spring 71 surrounds the bar 67 in the region between the ears 65 and 66 to provide frictional resistance against accidental movement of said bar.

Preferably, a hand grip 72 is fixed to the right hand end of the backer frame 35, as is most clearly illustrated in FIG. 2. Near that end, the frame is provided with laterally extending stop studs 73 and 74 which, in the illustrated position of the frame 35, are received and bottomed in notches 75 and 76 opening through the upper edges of the walls 21 and 22, whereby said frame is affirmatively held against clockwise rocking movement about the axis of the trunnions 34 beyond the illustrated position. At points equally spaced to the left from the axis of the trunnions 34, the walls 21 and 22 are formed with similar notches 77 and 78 which, when the backer frame has been rocked through 180° counter-clockwise from its illustrated position, receive the studs 73 and 74 to restrain the frame 35 against further rocking movement in a counter-clockwise direction.

Figure 5:
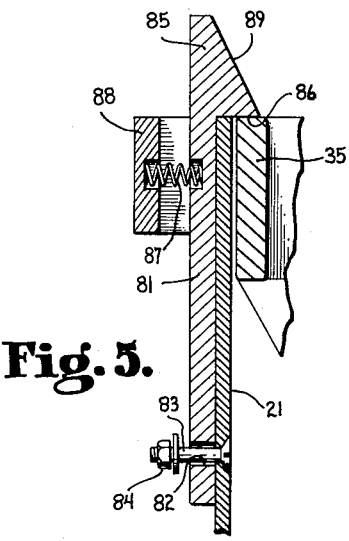
FIG. 5 is an enlarged, fragmentary section through a latch element.

Latches 79 and 80 are mounted on the wall 21 to cooperate with the frame 35 to hold the same respectively in either of its two extreme positions. Since the latches 79 and 80 are identical in construction, only one of them has been illustrated in detail in FIG. 5. Each such latch comprises a latch bar 81 formed near its lower end with a perforation 82 through which extends a stud or bolt 83 fixed to the wall 21 and carrying a nut 84. The perforation 82 sloppily passes the stud 83 so that the bar 81 is supported upon the wall 21 for limited movement relative thereto. At its upper end, the bar 81 is formed with a toe 85 shaped to define a downwardly facing catch surface 86 cooperative with an element of the backer frame 35 to restrain that element against upward movement. A spring 87 is confined between the bar 81 and a strap 88 and yieldably urges the bar 81 toward the wall 21 and its illustrated position. The inner face of the toe 85 is beveled as at 89. It will be clear that the toe 85 may be retracted manually against the tendency of the spring 87 for upward movement of the frame 35 to release the frame 35 for upward movement of the cooperating portion thereof; and that, as such portion of the frame 35 approaches the latch in downward movement, it will engage the beveled surface 89 to shift the toe 85 toward the left as viewed in FIG. 5 against the tendency of the spring 87 so that said portion of the frame 35 may pass the toe 85, whereupon the spring 87 will return the latch bar to its illustrated poistion to retain the frame.

The upper edge of the wall 21 is further formed with notches 90 and 91, equally and oppositely spaced from the axis of the trunnions 34, for the accommodation of the projecting end of the shaft 36 when the backer frame 35 is in its extreme positions, respectively.

Figure 8:
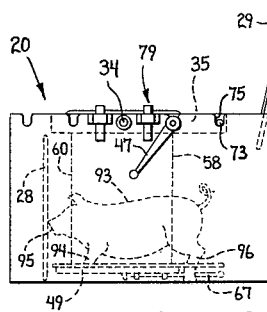
FIGS. 8 to 11 are reduced elevational views similar to FIG. 1 and showing successive steps in the operation of the apparatus in the handling of a pig.

Referring, now to FIGS. 8 to 11, when the machine is to be used, the ingress gate 26 is lifted to the position of FIG. 8 and a pig is driven into the cage. Usually, the animal will walk docilely onto the web 55 and until his snout 95 is substantially in contact with the gate 28; but upon closure of the gate 26, if it is found that the animal has not moved far enough forwardly, the attendant may grasp the handle 29' of the pusher 29 and, by swinging the pusher counter-clockwise about the hinge 30, may push the animal a few inches farther forward.

It will be seen that the pig's forelegs 94 are thus located on the web 55, while his hind legs 96 are behind the rear end 57 of the web. Now, with both gates closed, the crank 47 is rotated in a clockwise direction to wind the chains 58, 59, 60 and 61 onto the drums 37, 38, 44 and 45. The stringers 50 and 51 are thus lifted and moved toward each other while the chains 53 and 54 and the web 55 assume catenary curves thus snugly wrapping themselves about the torso of the animal. It is found that the animal's forelegs 94 will collapse during this first movement of the cradle parts, and he will assume substantially the position suggested in FIG. 7. As the runner 52 leaves the ground or floor, the pig will be lifted, with its hind legs 96 dangling in the manner suggested in FIG. 9. The straddle bar 67 is in its projected position, thus preventing interference between the hind legs and, to a considerable extent, inhibiting any tendency of the animal to kick. Actually, it is found that, as a general rule, the animal does not resent the action of the cradle and moves upwardly quite placidly.

As operation of the crank 47 continues, the animal's back moves into the space between the ribs 62 and 63 and is brought into contact with the pad 64, whereupon, as the chains are tightened, the animal will be completely immobilized. Meantime, of course, the pawl 41 has been ratcheting past the teeth of the wheel 40; and when the animal is snugly immobilized in the position of FIG. 7, rotation of the crank 47 can be discontinued and the pawl 41 will hold the winch assembly against retrograde movement.

Now, the latch 79 is manually retracted, and the backer frame 35, together with the cradle 49 and the animal confined therebetween, may be rocked in a counter-clockwise direction about the axis of the trunnions 34. Downward movement of the left hand end of the backer element and the cradle has an immediate component toward the right, so that the animal's snout begins immediately to move away from the gate 28. Since the gate 26 is upwardly and rearwardly inclined, the animal's dangling hind legs 96 will clear that gate. The hand grip 72 may be used for rocking the backer and cradle assembly or, if desired, the crank 47 may be used for that purpose, since the pawl 41 will prevent rotation of the shaft 36 and the crank handle thus becomes a lever effectively attached to the backer.

Figure 10:
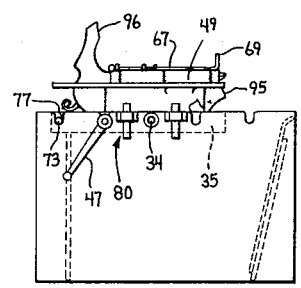

Depending upon the operation to be performed, the backer frame may be turned through 180° to the position of FIG. 10, wherein the latch 80 will engage the backer frame to retain it, or it may be desirable to turn the assembly only part way, to hold the animal in a position in which its rear end is presented upwardly. The apparatus is sufficiently flexible so that, without significant effort, the handler can hold the animal in any attitude which is most convenient for the veterinary. In order to expose the parts completely, the straddle bar 67 may now be withdrawn, as is suggested in FIG. 10.

Figure 9:
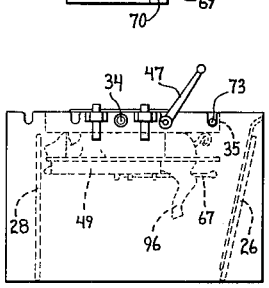
Figure 11:
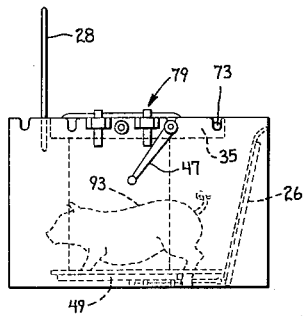

When all necessary operations have been completed, the latch 80 will be manually retracted and the backer will be turned in a clockwise direction back to the position of FIG. 9; and thereupon the pawl 41 may be lifted and the crank 47 may be turned in a counter-clockwise direction to lower the animal to the position suggested in FIG. 11. At this time, the egress gate 28 will be lifted and the animal may escape forwardly from the cage which will thereupon be ready for handling the next animal.

It is found in practice that, whereas pigs frequently give every indication of injury, pain and even emotional shock after surgery performed in the conventional manner while the animal is being suspended by his back legs, most animals leave the machine of the present disclosure in excellent condition and without symptoms of shock.

I claim as my invention:

1. A mechanical pig handler comprising a backer, means supporting said backer for bodily oscillation about a transverse axis intermediate its ends, a cradle, means supported from said backer and operatively connected to said cradle adjacent the opposite ends of the latter to support said cradle, in one position of said backer, dependently below said backer, means including said cradle supporting means manipulable to lift said cradle toward said backer, means cooperable with said lifting means at times to restrain said cradle against movement away from said backer, means effective, at times, to hold said backer in said first position, and means effective, at other times, to hold said backer in another position in which said cradle is at least partially above said backer.

2. A mechanical pig handler comprising a backer, means supporting said backer for bodily oscillation about a transverse axis intermediate its ends, winch means journalled on said backer upon axes parallel with said first-named axis and oppositely spaced therefrom, a cradle, flexible support means wound on said winch means and supporting said cradle, means providing a driving connection enforcing concurrent and equal rotation of said winch means about said respective parallel axes, means connected with one of said winch means for rotating the same, and means for retaining said backer in either of two positions of adjustment about said first-named axis.

3. A mechanical pig handler comprising a backer, means supporting said backer for bodily oscillation about a transverse axis intermediate its ends, a cradle, means supporting said cradle from said backer in an attitude generally parallel to said backer and operative to move said cradle toward said backer, means effective, at times, to restrain said cradle against movement away from said backer, and latch means operative to hold said backer in either of two positions of adjustment about said axis, said cradle comprising two elongated, transversely spaced, rigid stringers, transversely flexible web means spanning said stringers and transversely flexible strand means connecting said stringers in supporting relation to said web means, and said means supporting said cradle from said backer comprising at least two elements for each of said stringers connected at one end to said stringer, and anchor means on said backer for each such element, said anchor means being operable to move said one ends of said element synchronously toward said backer.

4. A mechanical pig handler comprising a backer, means supporting said backer for bodily oscillation about a transverse axis intermediate its ends, a cradle, means supporting said cradle from said backer in an attitude generally parallel to said backer and operative to move said cradle toward said backer, means effective, at times, to restrain said cradle against movement away from said backer, and latch means operative to hold said backer in either of two positions of adjustment about said axis, said cradle comprising two elongated, transversely spaced, rigid stringers, transversely flexible web means spanning said stringers and transversely flexible strand means connecting said stringers in supporting relation to said web means, and said means supporting said cradle from said backer comprising at least two flexible elements for each of said stringers connected at one end to said stringer at longitudinally-spaced points, a winch for each flexible element mounted on said backer, each flexible element being anchored for winding on its winch, means for rotating one of said winches, and means providing a driving connection enforcing synchronous rotation of all of said winches.

5. A pig handling machine comprising a cage having upstanding side walls and end walls, movable gate means at each end wall, journal means mounted near the top of each side wall upon a common axis, a backer elongated in a direction substantially parallel with said side walls and supported intermediate its ends upon said journal means for rocking about said axis, a cradle, means supported from said backer and connected to said cradle, said last-named means being of variable effective length from said backer to said cradle and having a maximum effective length at least equal to the height of said journal axis above the bottoms of said side walls, and means for selectively varying said effective length of said last-named means.

6. The device of claim 5 in which said cradle comprises a transversely flexible web means, said backer-supported means being operatively connected to said web means adjacent the lateral edges of said web means and said web means being significantly spaced from said movable gate means.

7. The device of claim 6 including cooperative stop means on said side walls and said backer for limiting rocking movement of said backer to substantially 180°, and releasable latch means carried by one of said side walls and cooperating with said backer in either of its extreme positions to restrain the same against movement toward its opposite extreme position.

8. The device of claim 6 in which each of said movable gate means is movable upwardly to open and in which one of said gate means further includes a portion which is movable toward the other gate means.

9. The device of claim 8 in which the spacing of said web means from said one gate means exceeds its spacing from the other of said gate means.

10. A pig handling machine comprising a pen having ingress and egress gates, a cradle disposed between said gates and proportioned and designed to underlie the forelegs and the torso of a pig confined between said gates, journal means supported from said cage upon a transverse axis between said gates at a level above a pig so confined, backer means supported intermediate its ends for rocking movement about said axis, means anchored on said backer means and supporting said cradle, and means carried by said backer means and operable to vary the effective length of said cradle-supporting means between said backer means and said cradle, the distance from said ingress gate to said cradle exceeding the distance from said cradle to said egress gate.

11. The device of claim 10 including a pusher hinged at its lower end to said ingress gate and projecting at its upper end above said ingress gate whereby, in any position of said ingress gate, the upper end of said pusher means may be swung toward said egress gate.

References Cited by the Examiner

UNITED STATES PATENTS

| | | | |
|---|---|---|---|
| 651,499 | 6/1900 | Byrd | 119—103 X |
| 871,023 | 11/1907 | Atwood | 119—103 |
| 1,109,820 | 9/1914 | Burcham | 119—103 |
| 1,277,052 | 8/1918 | Dunn | 119—102 |
| 1,788,924 | 1/1931 | Marrinan et al. | 119—103 |
| 2,737,153 | 3/1956 | Duport et al. | 119—103 |

SAMUEL KOREN, *Primary Examiner.*
ALDRICH F. MEDBERY, *Examiner.*